W. H. VIBBER.
PIPE CONDUIT FITTING FOR ELECTRIC INSTALLATION.
APPLICATION FILED SEPT. 26, 1913.
1,101,892.
Patented June 30, 1914.
2 SHEETS—SHEET 1.
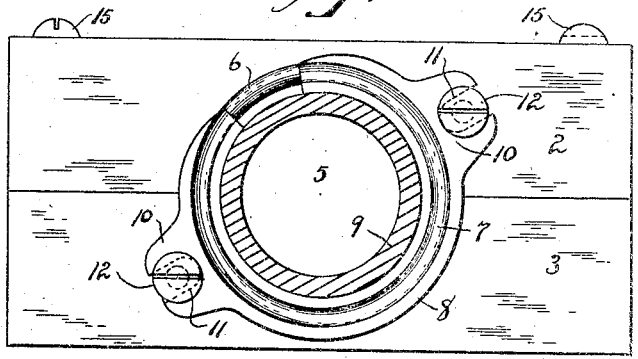
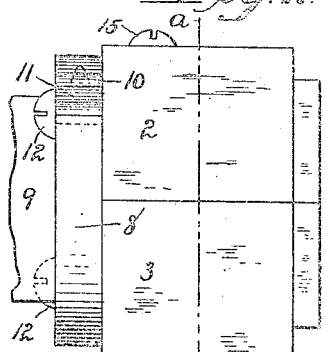
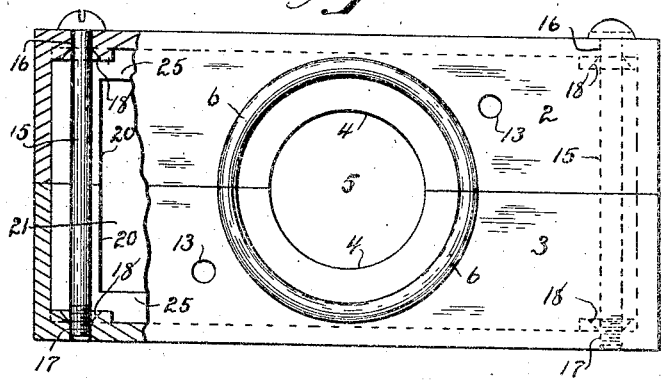
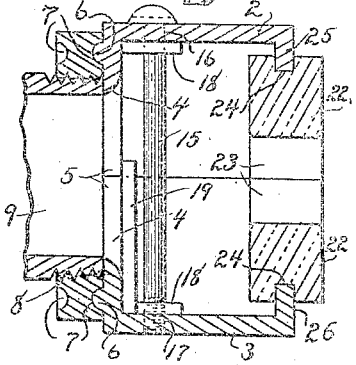
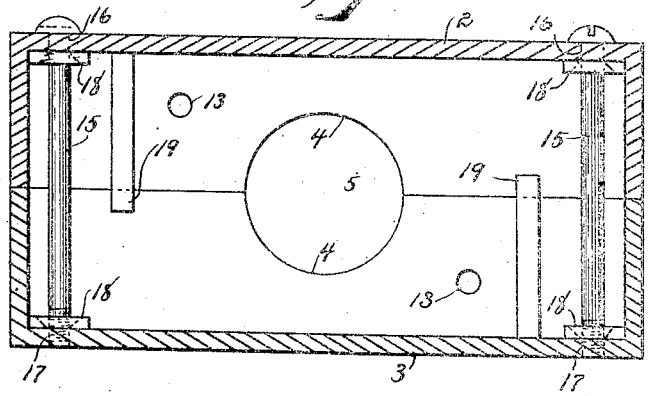

W. H. VIBBER.
PIPE CONDUIT FITTING FOR ELECTRIC INSTALLATION.
APPLICATION FILED SEPT. 26, 1913.
1,101,892.
Patented June 30, 1914.
2 SHEETS—SHEET 2.
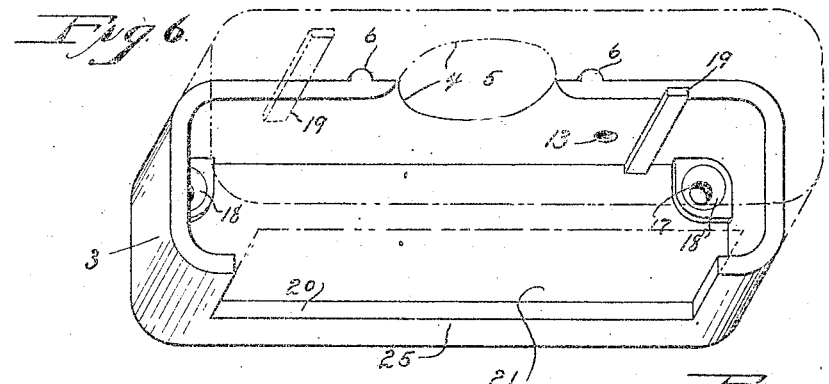
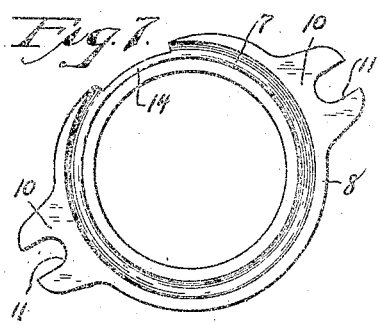
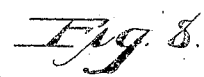
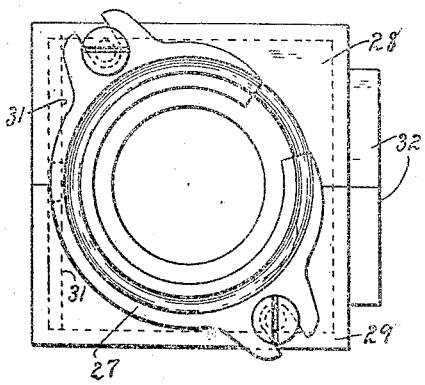
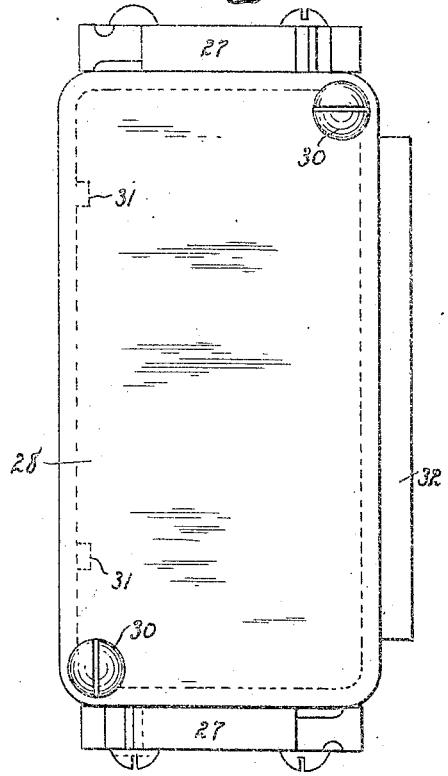
Witnesses
M. P. Nichols
C. L. Weed
Inventor
Wheeler H. Vibber
by Seymour & Earle
Attys

UNITED STATES PATENT OFFICE.

WHEELER H. VIBBER, OF NEW LONDON, CONNECTICUT, ASSIGNOR OF ONE-HALF TO THE GILLETTE-VIBBER CO., OF NEW LONDON, CONNECTICUT, A CORPORATION.

PIPE-CONDUIT FITTING FOR ELECTRIC INSTALLATION.

1,101,892.         Specification of Letters Patent.     Patented June 30, 1914.

Application filed September 26, 1913. Serial No. 791,917.

*To all whom it may concern:*

Be it known that I, WHEELER H. VIBBER, a citizen of the United States, residing at New London, in the county of New London and State of Connecticut, have invented a new and useful Improvement in Pipe-Conduit Fittings for Electric Installation; and I do hereby declare the following, when taken in connection with the accompanying drawings and the characters of reference marked thereon, to be a full, clear, and exact description of the same, and which said drawings constitute part of this application, and represent, in—

Figure 1 a reverse plan view of one form which my improved pipe-conduit fitting for electric installation may assume, the pipe being shown in section. Fig. 2 an end view thereof. Fig. 3 a view in transverse central section. Fig. 4 a reverse plan view, with the coupling-nut removed and one end of the box in section. Fig. 5 a view in longitudinal central section on the line $a$—$b$ of Fig 2 looking toward the top of the box. Fig. 6 an inside perspective view of the box showing one of the members in full lines, and the other in broken lines. Fig. 7 a detached view of the coupling-nut as supplied to the trade, that is, before it is cut. Fig. 8 a plan view of one of the modified forms which my improved pipe-conduit fitting may assume. Fig. 9 a view thereof in end elevation.

My invention relates to an improvement in pipe-conduit fittings for electric installation, the object being to produce a convenient and efficient fitting constructed with particular reference to adaptability to be applied after the wires have been drawn into the pipe-conduit and without disturbing their connections.

With these ends in view, my invention consists in a pipe-conduit fitting for electric installation, having certain details of construction as will be hereinafter described and pointed out in the claims.

In carrying out my invention as herein shown, I employ a longitudinally divided two-part box the sections or parts 2 and 3 of which correspond to each other in every substantial particular. The lower faces of the said parts 2 and 3 are formed midway of their length, with semicircular cuts 4 which, when the parts are assembled, together form a relatively large circular opening 5 for the passage of the wires. This opening is surrounded by a two-part concentric positioning-rib 6 entering either one of two concentric recesses 7 formed in the opposite face of the reversible internally threaded coupling-nut 8 which is designed to be screwed upon the threaded end of the pipe-conduit 9 which is thereby centered with respect to the circular opening 5.

For the attachment of the coupling-nut 8 to the two-part box, it is provided at opposite points upon its periphery, with slotted lugs 10 the outwardly opening slots 11 of which receive screws 12 entering holes 13 in the box-members 2 and 3. Under this construction, the heads of the screws fasten the box-members to the nut 8, and through the nut 8 to the pipe 9.

In order to enable my improved box-fitting to be applied to a pipe-conduit after the wires have been "run in", I initially form the coupling-nut 8 with a relatively thin segment 14 which is made integral with the nut, but which may readily be sawed away in case it is desired to slip the nut laterally over the wires instead of longitudinally over them. In case there is no occasion to resort to the lateral application of the coupling-nut to the wires, the segment 14 can be left undisturbed and the nut 8 used as any ordinary nut would be used.

The two box-members 2 and 3 are secured together by two transversely arranged binding-screws 15 passing through holes formed to receive them in the ends of the said box-members, the box-member 2 having smooth bore-holes 16, and the box-member 3 having threaded holes 17. To facilitate the assemblance of the box-members 2 and 3, counterbored centering-hubs 18 are formed within the said members 2 and 3 as shown in Fig. 4. These counterbored hubs guide the threaded ends of the screws 15 into place when the members 2 and 3 are being put together. To prevent the box-members from being swung out of alinement by the torsional tension of the screws 12, I provide the respective box-members with rib-like integral positioning-lugs 19 projecting beyond their lower edges, the lug of the member 2 engaging with the inner face of the member 3; and the lug of the member 3 engaging with the inner face of the member 2. The upper faces of the said box-members 2 and 3 are cut away as at 20 to together form a large, oblong rectangular opening 21 receiving a pair of insulating frames 22 formed with semi-circular openings 23 for the outward passage of the wires, these frames having their outer edges grooved as at 24 for the reception of the flanges 25 produced by cutting the box-members 2 and 3 away as at 20.

It will be readily understood from the foregoing that in case the wires have been "run in" a pipe-conduit, such as 9, my improved box-fitting may still be applied without disturbing the connections of any of the wires by simply cutting away the thin segment 14 of the nut 8 and passing the same laterally over the wires as they emerge from the end of the pipe. The nut will then be firmly screwed, as usual, upon the threaded end of the pipe, after which the box-members 2 and 3 will be assembled with respect to the wires and to the nut and secured together by the binding-screws 15 after which the assembled box will be fastened to the nut by the screws 12, whereby the box-fitting will be firmly fastened to the pipe-conduit through the medium of the threaded coupling-nut 8 screwed thereupon. Of course my improved box-fitting is equally well adapted to be screwed to a conduit-pipe before any wires are run into it. In such use it will be unnecessary to cut away the segment 14 of the nut 8 in case that has not already been done.

In the modified construction shown by Fig. 8, my improved box-fitting takes the form of a coupling-box, and is therefore provided at its opposite ends with coupling-nuts 27 corresponding in construction, application and function, to the coupling-nut 8 already described. In this construction, the box consists of two duplicate box parts or members 28 and 29 secured together by long screws 30 and prevented from swerving upon each other by lugs 31, the insulating-frames 32 being located in an opening in one side of the box. If desired, one of the two coupling-nuts 27 might be omitted, in which case the fitting would function as a terminal fitting the same as the fitting of Figs. 1 to 7 inclusive.

I claim:—

1. In a pipe-conduit fitting for electric installation, the combination with a sectional box, of means for securing the sections thereof together, and a nut internally threaded for application to the threaded end of a pipe-conduit, constructed to have the sections of the box fastened to it, and formed with a segment adapted to be cut away for the lateral application of the nut to wires already "run in" the pipe-conduit without disturbing the connections of the said wires.

2. In a pipe-conduit fitting for electric installation, the combination with a sectional box comprising two corresponding members formed on one side with an opening for the reception of insulating frames, and on the other side with an opening for the entrance of the wires, of screws for holding the two sections of the box together, and a coupling-nut internally threaded to adapt it to be screwed upon the threaded end of a pipe-conduit, provided with slotted lugs for the reception of the said screws by which the respective sections of the box are fastened to it, and formed with a thin integral segment for ready removal to adapt the nut to be laterally passed over the wires after the same have been "run in" the pipe-conduit and have been connected up.

In testimony whereof, I have signed this specification in the presence of two subscribing witnesses.

WHEELER H. VIBBER.

Witnesses:
EDNA MAYNARD,
CATHERINE SHEFFLOTT.